United States Patent [19]  
Brown

[11]  4,243,568  
[45]  Jan. 6, 1981

[54] ETHYLENE COPOLYMER COMPOSITIONS AND PROCESS FOR THE PREPARATION THEREOF

[75] Inventor: Peter Brown, Harlow, England

[73] Assignee: Polymer Investments N.V., Curacao, Netherlands Antilles, Netherlands Antilles

[21] Appl. No.: 14,452

[22] Filed: Feb. 23, 1979

[30] Foreign Application Priority Data

Feb. 23, 1978 [GB] United Kingdom ............... 7361/78

[51] Int. Cl.$^3$ ..................... C08L 31/04; C08L 23/08
[52] U.S. Cl. ..................... 260/29.6 R; 260/33.6 UA; 260/42.52
[58] Field of Search ............... 260/33.6 PR, 33.6 UA, 260/29.6 R, 42.52

[56] References Cited

U.S. PATENT DOCUMENTS

| | | | |
|---|---|---|---|
| 3,010,899 | 11/1961 | Boyer | 260/33.6 UA |
| 3,126,355 | 3/1964 | Birten et al. | 260/42.52 |
| 3,203,921 | 8/1965 | Rosenfelder | 260/33.6 UA |
| 3,235,529 | 2/1966 | Nagle | 260/33.6 UA |
| 3,256,228 | 6/1966 | Tyran | 260/29.6 R |
| 3,287,309 | 11/1966 | Basdekis et al. | 260/33.6 UA |
| 4,191,798 | 3/1980 | Schumacher | 428/95 |

*Primary Examiner*—Lewis T. Jacobs  
*Attorney, Agent, or Firm*—Sughrue, Rothwell, Mion, Zinn and Macpeak

[57] ABSTRACT

A process is described for preparing compositions comprising ethylene copolymers, such as ethylene-acrylate or ethylene-vinyl acetate copolymers, and compatible liquid hydrocarbons which act as inexpensive plasticizers or extenders, the process enabling large quantities of inert, e.g. inorganic fillers to be incorporated more simply than previously proposed processes. The hydrocarbon is compatible if it satisfies the test that there is no observable exudation of hydrocarbon from the copolymer when 50 g. of powdered copolymer are mixed with a quantity of hydrocarbon in a metal dish which is first heated to 120° C. to fuse the copolymer, second cooled and held at a temperature of −20° C. for 18 hours, and third warmed to room temperature. The compositions may be prepared either in the form of free-flowing powders or aqueous dispersions both of which are described and both of which have advantages when used in described situations as hot melt adhesives or coating compositions, especially for carpet backing techniques.

26 Claims, No Drawings

ETHYLENE COPOLYMER COMPOSITIONS AND PROCESS FOR THE PREPARATION THEREOF

FIELD OF THE INVENTION

This invention relates to a process for preparing compositions which comprise copolymers of ethylene in admixture with compatible liquid hydrocarbon oils and to the compositions which are the product of the process.

BACKGROUND OF THE INVENTION AND PRIOR ART

The ethylene copolymers which are employed in the process of the present invention are those thermoplastic polymeric substances which have been used in the prior art for preparing compositions according to so-called "hot melt" processes. Copolymers of ethylene and vinyl acetate have been prominent in hot melt technology while copolymers of ethylene with acrylate esters have been of lesser importance.

The uses and the compounding of adhesives to be employed in hot melt processes have been reviewed by J. D. Domine and R. H. Schaufelberg in Chapter 30 of the second edition of the "Handbook of Adhesives" edited by Irving Skeist and published by the Van Nostrand Reinhold Company in 1977.

According to the definitions contained therein, a hot melt adhesive is a thermoplastic compound, which is normally solid at room temperature and which becomes sufficiently fluid at elevated temperature to "wet" a substrate to which it is applied. On cooling from the molten condition the compound sets rapidly and forms strong bonds with the substrate. Crosslinking of the polymer is not necessary in order to obtain good physical properties, hence the cycle of melting and solidification can be repeated.

The use of compositions containing ethylene copolymers according to hot melt processes results in superior adhesion to a variety of substrates compared with the results obtained when polyethylene is the principal binder. Although ethylene/vinyl acetate copolymer-containing compositions are more susceptible to cold flow and to solvent attack than those which comprise either polyethylene or a polyamide as the principal binder, nevertheless by reason of their superior adhesion, good mechanical properties such as a high degree of flexibility, and their wide compatibility with a variety of modifier resins and waxes, these copolymers offer a wider scope for the formulation of adhesives and other useful compositions.

Water is absent from compositions which are applied by means of hot melt processes, likewise volatile organic solvents.

When an ethylene copolymer is to be used in a hot melt process, it is generally compounded with suitable modifier resins and/or waxes. Whereas the ethylene copolymer contributes elastomeric properties, which normally influence favourably such physical properties as cohesive strength, flexibility, toughness and adhesion, at both low and elevated temperatures, and contributes to the realization of an acceptable melt viscosity, the modifier resin imparts specific adhesion to the substrate and "wetting" thereof by the composition. Non-polymeric or non-resinous components often added to adhesive compositions applied as hot melts are waxes as mentioned above; liquid plasticizers; inorganic fillers; pigments; antioxidantes etc.

According to the aforesaid chapter in the "Handbook of Adhesives" edited by Irving Skeist, plasticizers or liquid modifiers are used to a limited extent in order to impart such properties as flexibility, specific wetting and viscosity characteristics to the composition. The liquid plasticizers which have been previously proposed for use together with ethylene copolymers in compositions to be applied by hot melt processes belong generally speaking to the class of organic esters, although other liquid substances such as chlorinated polynuclear aromatic compounds have also been proposed. The particular plasticizer and the proportion thereof used in a particular composition depend upon a number of factors, important considerations being the cost and the compatibility of the plasticizer with the other ingredient of the composition, especially with the ethylene copolymer.

In order to indicate the quantitative range of ingredients most often used in the commercial practice of hot melt processes, reference is made to the following table reproduced from Chapter 1 of the "Handbook of Adhesives".

| Ingredient | Proportion by weight, % |
| --- | --- |
| Ethylene copolymer(s) | 20–50 |
| Modifier resin(s) | 20–50 |
| Wax(es) | 0–20 |
| Plasticizer(s) - liquid | 0–20 |
| Filler(s) | 0–20 |
| Antioxidant(s) | 0.1–1 |

The same work of reference, on pages 502–504, draws attention to some of the difficulties associated with commercial-scale hot melt processes involving the use of ethylene/vinyl acetate copolymers in the carpet industry, for the following end-uses:
1. double back lamination of tufted carpets,
2. carpet seaming tapes, and
3. peel and stick carpet tapes.

In the case of double back lamination, attention is directed to . . . "the most difficult problem, as yet not satisfactorily solved, (is) applying a high viscosity hot melt to a carpet 15 ft. wide with good uniformity in both machine and transverse directions". After citing and discussing a formulation, the authors comment that: "EVA (ethylene/vinyl acetate) copolymers containing 28 to 33% VA (vinyl acetate) and with a melt index of 5 to 20 have been used for carpet back laminating. These have given the best balance of properties and viscosity. While lower M.I. (melt index) copolymers would have better physical properties, they are much too high in viscosity. Lower VA copolymers are less expensive but have poorer adhesion and flexibility than 28 to 33% VA products" . . . "This application requires a very inexpensive formulation . . . Fillers have to be used sparingly to lower cost because they significantly increase viscosity and reduce flexibility. Since only medium M.I. (5 to 20 dg/min.) copolymers are used, high loadings of filler greatly reduce tensile strength and elongation resulting in a crumbly product".

In addition to the difficulty of applying such large volumes of molten composition to a substrate, there exists also the difficulty of heating and mixing a number of ingredients together in large quantities to form a uniform viscous mass, and of delivering it to the locus of application, whether it be from equipment in an adjacent area of the same plant, or from a different plant altogether.

We have now discovered a process whereby these difficulties can be alleviated or even eliminated, which is of wide applicability for many end-uses for which hot melt processes could be employed according to the prior art, but demonstrating advantages in cases in which large volumes of the composition are being consumed such as in the backing of tufted carpets. This discovery is based upon the discovery that members of a certain class of relatively inexpensive liquid hydrocarbon oils have excellent compatibility with ethylene copolymers after mixtures comprising the latter in powder form together with the hydrocarbon oil have been heated to the melting temperature of the resin.

It is known to be possible to carry out size reduction of certain ethylene copolymers, such as ethylene-vinyl acetate 72/78 copolymers (72% ethylene-28% vinyl acetate) having a low melt index value such as about 5 denoting a relatively high molecular weight compared with copolymers having the same composition and which exhibit a higher melt index. Using equipment and processes known in the prior art it is possible to obtain these copolymers in the form of free-flowing powders. We have now made the valuable and surprising discovery that large proportions of the aforesaid compatible liquid hydrocarbons may be added to an ethylene copolymer in the form of a solid powder utilising simple mixing equipment and without heat.

BRIEF DESCRIPTION OF THE INVENTION

According to one aspect of the present invention there is provided a process for preparing a composition comprising an ethylene copolymer and a liquid hydrocarbon, wherein an ethylene copolymer which is in the form of a solid powder is mixed with from 40 to 220, preferably 80 to 120, parts by weight per 100 parts by weight of ethylene copolymer of a liquid hydrocarbon, preferably a high aromatic hydrocarbon, which satisfies the compatibility test hereinafter defined, to form a blend of discrete solid particles comprising at least these two ingredients, the resulting composition being capable of flowing freely.

One of the valuable features of the present process lies in the feasibility of readily incorporating relatively large proportions of inorganic fillers in the resulting composition, while still preserving all or some of the valuable physical characteristics of prior art hot melt composition containing an ethylene copolymer as the principal binding agent, such as flexibility, good adhesive and cohesive properties, toughness and tear resistance. In prior art hot melt processes, powdered inorganic filler was mixed with the molten copolymer and other ingredients and the mere step of mixing these materials was an inconvenient operation when carried out on a large scale, the drawbacks of which are overcome by utilizing the present process. The amount of plasticizing liquid hydrocarbon oil used in the present process to form the free-flowing compositions varies from 40 to 220, preferably from 80 to 120, parts by weight per 100 parts by weight of ethylene copolymer. The criterion both as to the amount of plasticizing liquid hydrocarbon and the type thereof is a simple compatibility test to be described hereinafter.

It appears that the effect of plasticizing the ethylene copolymer with the compatible hydrocarbon oil is actually to make a contribution to the flexibility and extensibility of the copolymer without seriously impairing the toughness, tear strength, abrasion resistance, tensile strength and elastomeric properties which are characteristic of the copolymer. The resulting combination of physical properties has excellent technological merit. Among the other advantages gained, prominent is that of the capability of ready incorporation of very high proportions of suitable cheap inorganic fillers without undue sacrifice of the excellent physical properties. As will be shown later, it has become possible by the present process readily to produce new tough and flexible yet highly filled compositions at a relatively low total raw material cost and low mixing costs.

Apart from fillers, other ingredients conventionally present in ethylene copolymer or hot melt compositions may, if desired, be present in the present ethylene copolymer compositions. However, in many cases, the presence of the liquid hydrocarbon, which is relatively inexpensive compared with the copolymer, obviates the necessity or desirability of adding other materials such as modifier resins, waxes and other liquid plasticizers.

Using the present process, it is possible to provide the very desirable facility of formulating relatively flexible yet highly filled compositions containing one or more polymeric binding agents and suitable inorganic fillers, such that efficient binding of high proportions of the inorganic fillers is obtained. Such compositions are frequently applied to the surfaces of both rigid or semi-rigid and of more or less flexible substrates such as woven fabrics, non-woven fabrics, scrims, paper, cellulosic boards, metallic and organic polymeric films and foils, felts and other matted, needled and bonded organic or inorganic fibres, and so on, with the object of producing such articles as carpets and other floor-coverings, textile goods of wide variety, papers having certain specific properties, coated tapes etc. Latices or emulsions of natural and synthetic elastomeric or flexible polymers have been widely used for such purposes, as has polyvinyl chloride plasticised with ester-type plasticizers, but the present process provides a new binder system which is sometimes both cheaper and more efficient with respect to raw material costs and to the economics of preparation and use.

A further advantage of employing large proportions of compatible hydrocarbon oil to plasticize the ethylene copolymer is that the fusion temperature required to fuse the composition is substantially lowered when the composition is prepared by the present process. Surprisingly, in the applications and end-uses which we have investigated, there is little or no tendency for migration of the liquid hydrocarbon out of the composition under normal service conditions.

Accordingly, another aspect of the present invention provides a composition comprising a blend of an ethylene copolymer and a liquid hydrocarbon and, optionally, a filler, in the form of a free-flowing dry powder prepared by the present process.

It is a surprising and unexpected feature of the present invention that when the liquid hydrocarbon is added to the ethylene copolymer in an amount of from 40 to 220 parts by weight per 100 parts by weight of ethylene copolymer, that within this range, the liquid hydrocarbon is rapidly dispersed and absorbed in such a way that the mixture retains the properties of a free-flowing powder.

This free-flowing powder comprising the ethylene copolymer mixed with plasticizing liquid hydrocarbon may be used by the methods conventional to powder resin technology. That is to say, the powder may be applied to the surface or to the substrate to be coated or to be bound and then fused by application of heat, or the powder may be applied to the previously heated substrate in order to effect fusion. In either case, the process of preparing a composition comprising a mixture of ethylene copolymer resin plasticized with compatible liquid hydrocarbon in large proportions by means of powder mixing is not one which has previously been employed in the prior art and represents a significant advance in the art.

It is desirable that the particles of powdered ethylene copolymer should not be greater than 1200 microns (1.2 millimeter) in size. Preferably, at least 80% by weight of the powder should have a particle size not exceeding 700 microns in size, while the remaining 20% by weight may have a size of from 700 to 1200 microns. Particularly good results are obtained using a powder having particles in the range of from 50 to 700 microns in size, between about 90 and 100% by weight of the copolymer powder being contained in this range. Nevertheless we do not exclude the use of ethylene copolymers ground to finer or coarser powders than denoted above, or ground to broader or narrower ranges of distribution of sizes, providing that said copolymer is in the form of a free-flowing powder, after it has been mixed with the compatible liquid hydrocarbon. The use of coarser powders in the present process may lead to rougher surfaces when the composition is applied to a substrate or to grainier compositions and may demand higher fusion temperatures or longer periods at elevated temperatures in order to bring about fusion and flow into a well-bonded coherent composition. The particle sizes referred to are measured by sieving on standard screens, but may also be estimated by use of an optical microscope.

In the use of the present composition involving fusion of the mixture comprising powdered copolymer, plasticizing hydrocarbon oil and one or more inorganic fillers in powder form, it is desirable to use low density fillers in order to ensure the formation of free flowing powders. For example, magnesium carbonate is very suitable, either alone or in combination with calcium carbonate.

It will be appreciated that an important advantage possessed by the compositions made by the present process is the excellence of the physical properties which they exhibit, especially their flexibility and toughness, such that very high proportions of inorganic fillers may also be present without causing undue sacrifice of the physical properties. Since these inorganic fillers are best used in powder form, the ability to prepare the mixture of ethylene copolymer resin and compatible plasticizing liquid hydrocarbon in the form of free-flowing powder renders relatively simple the subsequent addition and mixing of substantial proportions of powdered inorganic filler, using the same mixing equipment if necessary.

The resulting powder mixture comprising ethylene copolymer, compatible plasticizing liquid hydrocarbon, inorganic filler and any other ingredients necessary may finally be applied to the surface or substrate to be coated or bonded in the form of a powder and then fused by means of heat.

It is a surprising and valuable discovery that the ethylene copolymer in the compositions made by the present process is capable of binding efficiently very high proportions of inorganic fillers, while still retaining the ability to adhere to the surfaces of substrates to which the composition may be applied and which may or may not be fibrous in nature. We attribute retention of this adhesive property to the presence of relatively high proportions of compatible hydrocarbon oil, which, by reason of its being an efficient plasticizer for the ethylene copolymer, promotes the wetting of the particles of filler by the plasticized copolymer upon fusion of the latter by heat. At the same time the molten plasticized copolymer retains the ability to wet the surface of substrates to which the composition is applied, and the adhesion to substrates which is characteristic of this class of ethylene copolymers when used in hot melt compositions typified in the prior art is not unduly impaired.

According to a further aspect of the present invention there is provided a composition comprising a blend of an ethylene copolymer and a liquid hydrocarbon and, optionally a filler in the form of a free-flowing aqueous dispersion. This dispersion may be prepared by subsequently dispersing the dry powder blend in water or by carrying out the mixing in water. The resulting dispersion or suspension in water may be further utilised and applied by methods which are familiar in the art of using and applying aqueous latices or dispersions of high polymers, whether synthetic or natural.

In latex technology it is common practice to add to an aqueous polymeric latex or dispersion, inorganic fillers and other ingredients in powder form, together with dispersions of modifier resins, such as tackifying resins, plasticizers or extending oils, thickeners, dispersing agents and stabilisers, antioxidants etc., with or without heat, utilising relatively simple stirring and mixing equipment. Similar equipment may also be used to disperse in water a powder blend of ethylene copolymer and compatible liquid hydrocarbon which has previously been formed by dry mixing in air and in fact simple mixing equipment is most suitable. For example, having dispersed in water the powder comprising the ethylene copolymer and compatible liquid hydrocarbon with the aid of emulsifying agents and emulsion stabilisers if necessary, powdered inorganic fillers and other ingredients may also be added, either dry or already dispersed in water. The order of mixing and dispersing in water is not critical and may be varied according to convenience, but in any case te resultant aqueous dispersion may be applied and used according to processes of aqueous latex technology. It is preferred that the preparation of the aqueous compositions and their first application to the substrate should be carried out at ordinary ambient temperatures, or at any rate at temperatures below the fusion temperature of the ethylene copolymer, followed, upon use, by the steps of drying and fusion at an elevated temperature which may be carried out at the same time.

It will be understood that when the powdered copolymer is converted into an aqueous dispersion, virtually no change occurs in the size and shape of the granules or particles. The range of sizes of these particles which are present, and which have previously been specified, is much greater than the range present in true aqueous polymeric emulsions or latices, such as those made by aqueous emulsion polymerisation. The difference in size amounts to two or three orders of magnitude. To the best of our knowledge aqueous copolymer latices, in which the copolymers have the composition useful in the process of the invention, are not articles of commerce.

Therefore when a preferred embodiment of the process is employed, involving the intermediate preparation of aqueous dispersions comprising the powdered copolymer, the evaporation of water during drying probably contributes little or nothing to the formation of strong coherent compositions. The mechanism of film formation is quite different from that of aqueous polymer latices, and involves rather the presence of the plasticising oil in or surrounding the particles at the fusion temperature of the copolymer. The mechanism is essentially the same whether water is present or not. Hence the present process involving the use of aqueous dispersions is essentially an extension of the process involving the use of dry powders, and water serves merely as a medium for transport of the mixture to the locus of application, and for yet easier and more intimate mixing of the powdered copolymer, the hydrocarbon oil and the filler if a filler is to be employed, especially when high proportions of filler are present.

In using these aqueous dispersions, whether containing high proportions of dispersed filler, no filler or intermediate proportions, a distinction in the possible methods of use may be recognised compared with methods commonly used in conventional latex technology. After evaporation of water with the aid of heat, for example in forced draught ovens using air at elevated temperatures, the fused composition by reason of the high degree of thermoplasticity of the ethylene copolymer resin plasticized with compatible hydrocarbon oil, is in a deformable and adherent condition when hot. In this condition the composition may readily be moulded, extruded, calendered or sheeted, or, if spread on the surface of a substrate, may be embossed with a pattern if desired. Alternatively, other surfaces such as those of textiles or paper may be applied and adhered to the surface of the hot composition. Thus the combining of textiles or of carpet backings, for example, can be carried out very rapidly and efficiently compared with the use of conventional polymer latices or emulsions, in which the dispersed polymer phase is much less thermoplastic, and the use of which calls for the presence of some moisture during combining in order to form strong bonds between the surfaces to be combined. Thus the use of the process involving a mixture comprising powdered ethylene copolymer and compatible liquid hydrocarbon in the form of aqueous dispersions may result in much more rapid and efficient processing on a large scale than is the case in conventional backing or combining processes using an aqueous latex, since drying of the adhesive layer may be complete before application of the backing to the textile or carpet.

In another embodiment of forming the aqueous dispersions by the present process, the powdered ethylene copolymer and the compatible liquid hydrocarbon are not mixed together in an essentially anhydrous condition but are mixed together in the presence of water and dispersed therein, optionally in the presence of the filler or fillers if any, which may already be dispersed in the water.

This may be achieved either by making separate aqueous dispersions of the various constituents and then mixing them, or more conveniently and preferably by addition of the powdered ethylene copolymer, the compatible liquid hydrocarbon and, optionally, the filler or fillers, if any, each in an essentially anhydrous condition, to water in the same vessel or container. This preferred procedure for carrying out this embodiment of the process is a highly convenient process for preparing the compositions using the techniques of latex technology, since all the mixing can be done in one vessel, if desired, including the powdered ethylene copolymer, the compatible liquid hydrocarbon and the powdered inorganic filler or fillers, if any. As in the case of forming aqueous dispersions using a preformed powder blend of the ethylene copolymer and the hydrocarbon oil, simple mixing equipment is very suitable. Emulsifying or stabilising agents may be used to aid the formation of an aqueous dispersion, and the various constituents may be added in any order provided they are all thoroughly mixed and dispersed.

It is very surprising that stable aqueous dispersions may be obtained by these procedures which do not exhibit significant sedimentation over long periods of time. Only relatively small proportions of water are required in order to form highly fluid dispersions which have a very high content of non-volatile constituents and which exhibit good rheological behaviour, since water is an excellent volatile and inert dispersing medium.

When the aqueous dispersion contains substantial proportions of a powdered inorganic filler or fillers, the specific surface area of the particles of such filler or fillers should preferably be in the range of 2.5 to 3.4 cm.$^2$/mg., otherwise the aqueous dispersions tend to be unstable on storage or unsuitable in other respects.

These aqueous dispersions comprising the powdered ethylene copolymer and compatible liquid hydrocarbon and the inorganic filler, if any, in powder form possess the advantages of ease of transport to the locus of application and the ease of application by such methods as spraying or spreading compared with molten mixtures, or even compared with the aforesaid free-flowing powders comprising the ethylene copolymer and compatible liquid hydrocarbon. Further, after application of the aqueous dispersion, it can be rapidly dried and fused simultaneously in forced draught hot air ovens, in which the powder mixture would be susceptible to dispersal.

When the composition is in the form of an aqueous dispersion, it may be desirable to incorporate in the dispersion a preformed latex copolymer. When such a dispersion is applied as a coating composition, the presence of the preformed latex serves to give the composition some strength ("green strength") and serves to retain it in position before it is fused. The latex may also serve to bind or assist in binding the ethylene copolymer and hydrocarbon prior to fusion. The preformed latex which is incorporated in the aqueous dispersion is preferably a latex of an oil-resistant polymer such as a vinyl acetate-ethylene 80/20 copolymer which is a particularly suitable latex polymer when the ethylene copolymer of the dispersion is an ethylene-vinyl acetate copolymer.

The ethylene copolymers which may be used to form the present compositions are typically ethylene-acrylate copolymers and ethylene-vinyl acetate copolymers, the latter being preferred. In the latter preferred copolymers, the proportion of copolymerized vinyl acetate units is preferably from 18 to 40% weight, more preferably from 18 to 28% by weight, the remainder of the weight of the copolymer comprising units of copolymerized ethylene. These copolymers are also characterised according to their melt index, which is determined according to standard test procedures, and which is a measure of the melt viscosity of the copolymer. It is believed that the melt viscosity in turn relates to the mean molecular weight of a copolymer of a given chemical composition and is also influenced by the molecular weight distribution. A low melt index corresponds to a high melt viscosity and a high molecular weight. The copolymers which are relatively readily susceptible to mechanical size reduction to a powder by means of processes known to the prior art are the copolymers which are stiffer and less deformable at ordinary ambient temperatures, that is to say, those which have a lower rather than a higher melt index.

Therefore in order to use a copolymer in powder form, it is necessary first to determine which qualities of copolymer may be obtained as powders by size reduction by means of processes known in the prior art. Then it is necessary to determine which liquid hydrocarbon oils have compatibility with the copolymer or copolymers selected, and in what proportions, and whether the properties of the resulting composition are suitable for the use envisaged.

As indicated above, the compatible liquid hydrocarbons which are used to form the compositions of the invention are employed in proportions of from 40 parts by weight to 220 parts by weight per 100 parts by weight of ethylene copolymer present, and preferably from 80 to 120 parts by weight. A single hydrocarbon oil may be employed or two or more, provided that the mixture has compatibility with the copolymer or copolymers selected, in the total proportion which it is desired to use within the ranges defined above.

We find that these liquid hydrocarbons belong mainly to the class sometimes described as high aromatic oils. We believe this description denotes the presence in the oil of a predominant fraction of hydrocarbons the molecules of which consist of alkyl or cycloalkyl-aromatic compounds. Nevertheless we do not exclude other normally liquid hydrocarbons which do not conform with this description, nor do we intend to suggest that all so-called high aromatic hydrocarbon oils will be found suitable. Indeed it is the case that some commercially-available high aromatic hydrocarbon oils do not exhibit the degree of compatibility with ethylene-vinyl acetate copolymers sufficient to make them suitable for use in the present process although all liquid hydrocarbons found suitable hitherto do fall within this class based on the information available from suppliers thereof.

By way of description, some of the properties of two commercially-available compatible hydrocarbon oils, which yield excellent results in the process of the invention, are tabulated hereunder:

|  | *Enerflex 711 | *Gulfrex 55P | Method |
|---|---|---|---|
| Supplier | BP Oil Ltd. | Gulf Oil Co. | |
| Specific gravity 15.5/15.5° C. | 1.01 | 0.992 | |
| Kinematic viscosity, c St | 24 (60° C.) | 54 (38° C.) | |
| (Volatility - Wt. loss, (3 hours 163° C. | 5.0 | 1.4 | IP45 |
| Aromatic C atoms % | 42 | 44 | ASTM D2140 |
| Naphthenic | 32 | 26 | |
| Paraffinic | 26 | 30 | |
| Saturates, Wt. % | 14 | 10 | ASTM D2007 |
| Aromatics, Wt. % | 85 | 86 | |
| Polar, Wt. % | 1 | 4 | |

*Trade Names

The hydrocarbon oils to be used in the present process to form the compositions must conform to the following test. A quantity of powdered ethylene copolymer, 50 grams in weight, is thoroughly mixed by hand in a metal dish with a quantity of oil within the range specified previously. The dish is placed in an oven at a temperature of 120° C. for a few minutes in order to fuse the polymer. The dish is then withdrawn, cooled, and placed in a cabinet cooled to a temperature of −20° C. for 18 hours. The dish is allowed to warm to room temperature and the polymer examined. If the oil is compatible no exudation from the polymer is observed.

The test may be repeated a number of times utilising various proportions of oil within the broad range specified. The maximum proportion of oil which may be employed to form the composition is that proportion which just exhibits compatibility according to the test prescribed.

The hydrocarbon oils which may be used to form the present compositions are normally liquid at room temperature, that is to say, they exhibit viscosities not exceeding about 1000 poise at room temperature, although they may be polymeric in nature.

The inorganic powdered fillers, which are optional although preferred constituents of the present compositions, are those in common use in latex technology including, for example, calcium carbonate, clay including kaolin, barytes, alumina, slate, titanium dioxide, silica, mica and talc. They may be used in proportions up to 600 parts by weight and more based upon the weight of copolymer present. As previously noted, relatively low density and large particle size fillers are preferred.

Other constituents employed in the formulation of conventional hot melt adhesives comprising ethylene copolymers may also be present in the present compositions in minor proportions. It should be noted that the resins and waxes added to previously proposed hot melt compositions do not in general perform the same function as the compatible hydrocarbon liquids in the present compositions. Therefore although they may optionally also be present in proportions proposed in the prior art, they will be present as additions rather than as substitutes for the compatible liquid hydrocarbon.

Among other constituents which may be present during the processes are foaming agents or foam stabilizers of the kind used in latex technology. These may be incorporated in the aqueous dispersions, particularly in conjunction with the preformed latex, if any, in order to enable a mechanically formed aqueous composition to be prepared so that the spreading and penetration advantages of foamed compositions can be made use of, or solid foamed compositions can be prepared by drying. Alternatively chemical blowing agents could be incorporated in the dry composition in order to prepare solid compositions in an expanded or blow form.

As indicated above the processes may be used where hot melt adhesive or coating processes have been previously used, but the compositions can be cheaper than the previous compositions due to the presence of large amounts of liquid hydrocarbon plasticizer or extender and filler which are cheaper than the ethylene copolymer resins and which can readily and easily be compounded therewith by the described processes.

EXAMPLES OF THE INVENTION

The invention will now be illustrated by the following Examples.

EXAMPLE 1

A sheet was prepared from equal quantities by weight of an ethylene-vinyl acetate copolymer in powder form sold under the trade name "Evantane" 28-05/041 and a high aromatic liquid hydrocarbon sold under the trade name "Enerflex" 711. "Evatane" 28-05/041 was supplied by Imperial Chemical Industries Ltd. to the following specification:

| | |
|---|---|
| Vinyl acetate content of copolymer | 28% by weight |
| Melt flow index | 5 dg/minute |
| Particle Size | 90% by weight 150-400 microns |
| | 10% by weight less than 150 microns |

"Enerflex" 711 was supplied by British Petroleum Ltd. to a specification containing the following particulars:

| | | |
|---|---|---|
| Specific gravity | | 1.01 (at 60° F.) |
| Refractive index | | 1.56 (at 20° F.) |
| Average M.Wt. | | 280 |
| Carbon type analysis | Aromatic carbon atoms | 42% |
| | Naphthenic carbon atoms | 32% |
| | Paraffinic carbon atoms | 26% |
| Molecular type analysis (Clay-gel) ASTM D2007 | Saturates | 14% by weight |
| | Aromatics | 85% by weight |
| | Polars | 1% by weight |

The mixture of copolymer powder and oil was a free-flowing powder. A quantity was placed in a dish and heated in an oven at 120° C. and then cooled to room temperature thereby to form an amber-coloured clear sheet 3–5 mm. thick, which was flexible and showed no signs of bleeding of the plasticizer oil, even after storage in a deep-freeze cabinet for 18 hours at −20° C.

Dumbbell test specimens were cut and tested in an "Instron" tensile tester. The following data were obtained as an average of 5 specimens:

| | |
|---|---|
| Tensile Strength | 5.7 MPa |
| Elongation at break | 879% |
| Modulus at 700% extension | 4.3 MPa |

Plastic flow occurred at about 100% extension, but at extensions up to this value elastic recovery resembled that of a true elastomer.

EXAMPLE 2

An aqueous dispersion was prepared by mixing the following ingredients in the stated proportions by weight, the ingredients being added in the order set out. The ingredients were mixed in a vessel using a simple propellor-type stirrer on a central shaft as a mixer.

| Ingredients | Parts by weight |
|---|---|
| 1. Water | 115.32 |
| 2. "Calgon", as a 25% aqueous solution | 4.00 |
| 3. "Perlankrol" EAD 60, as a 60% solution (ammonium trioxyethylated tridecanol sulphate, trade-name of Lankro Chemical Co.) | 4.00 |
| 4. Carbon black, as a 35% disperson | 0.5 |
| 5. "Enerflex" 711 | 125.00 |
| 6. "Calmote" H2RT (ground calcium carbonate) | 450.00 |
| 7. "Evatane" 28-05/041 | 100.00 |
| | 798.82 |

A smooth free-flowing dispersion was obtained which thickened on storage for 24 hours at room temperature.

A thin coating of the mix was applied to the back of a woven poly-propylene scrim into which had been inserted tufts of carpet yarn. After rapid drying under infra-red heaters, the fabric passed under a second doctor blade where a thicker coat of the mix was applied. The fabric was then passed into an oven heated by means of steam pipes to an air temperature of 120° C. Rapid evaporation of water and fusion of the copolymer occurred. On leaving the oven a water-cooled embossing roller was used to impress a waffle pattern on the backing, which was still soft although dry. After cooling the backed carpet was punched into tiles and boxed.

The tufts of pile were strongly anchored and the carpet shows good flexibility and "lay-flat" properties. The weight of dry loaded mix applied was 3.5 kg/m². The appearance and abrasion resistance and ageing resistance were very suitable for carpet tiles.

EXAMPLE 3

An aqueous dispersion similar to that described in Example 2 was made by mixing the following ingredients in the stated proportions by weight, the order of addition being as set out.

| | Constituents | Parts by weight |
|---|---|---|
| 1. | Water | 150 |
| 2. | "Perlankrol" EAD 60, 60% | 4 |
| 3. | "Calgon", 25% | 4 |
| 4. | "Enerflex" 711 | 140 |
| 5. | "Calmote" H2RT | 500 |
| 6. | DD Clay | 100 |
| 7. | "Evatane" 28-05/041 | 100 |

A tufted cloth comprising tufts of yarn inserted into a polypropylene woven scrim was doctored with the above dispersion and passed into a forced-draught oven heated by gas to a temperature of 120° C. Rapid drying occurred. While the polymer on the backing was still in the fused condition a woven jute fabric was laminated to the backing under gentle pressure by a roller. The carpet was then cooled and rolled up.

The tuft bond of the pile yarns and the delamination resistance of the jute secondary fabric were excellent, and the handle and drape of the carpet were very suitable for this quality of tufted carpet.

EXAMPLE 4

An aqeuous dispersion similar to that described in Example 2 was prepared, using 140 parts by weight of "Enerflex" 711 oil instead of 125 parts by weight and 450 parts by weight of "Calmote" MG (also a ground calcium carbonate). This dispersion was applied to woven jute scrim; the coated fabric was passed through a drying oven and then applied, while still at a temperature of about 120° C., to a very open-structure mat-type floor covering, in such a way that the uncoated surface of the jute was in contact with the back surface of the matting to be coated. While still hot enough to maintain the coating in a molten condition, the composite fabric was then passed between chilled combining rollers. The application of pressure caused the molten composition to flow through the interstices in the jute fabric and to form a bond between the jute and the matting. The final application weight of the EVA copolymer-oil composition was varied between 2½ and 3 kg./m.$^2$.

This is a very suitable method for applying a coating to an open-structured textile, in the above case the matting. If a coating were applied direct, considerable penetration would occur, resulting in a very heavy coating weight. The backing fabric may be derived from either jute or polypropylene, and may be either open or close in texture. The copolymer/oil composition which remains on the surface of the backing serves as a non-slip underlay, and may be embossed.

EXAMPLE 5

A mix was made using the following constituents:

|   |   | Parts by weight |
|---|---|---|
| 1. | "Evatane" 28-05/041 | 100 |
| 2. | "Gulfrex" 55P oil | 125 |
| 3. | "Calmote" MG | 400 |

The oil was added to the copolymer powder in portions, while stirring in a simple blade mixer. Finally the filler was added, resulting in a free-flowing powder.

The powder was applied to the reverse surface of a tufted carpet which had previously been pre-coated with a carboxylated latex/filler mix and then rapidly dried. The powder coating was smoothed out by passing the carpet under a blade, and them melted by passage under infra-red lamps. While still in a molten condition the carpet was passed between cold combining rollers to form a bond. The weight of backing applied was 3¼ kg./m.$^2$.

A pattern may be applied to such a backing by means of an embossing roller. The deeper and the closer the pattern, the softer is the hand of the finished carpet compared with the smooth backing.

I claim:

1. A process for preparing a composition comprising an ethylene copolymer and a liquid hydrocarbon, the process comprising mixing an ethylene copolymer which is in the form of a solid powder with from 40 to 220 parts by weight per 100 parts by weight of ethylene copolymer of a liquid hydrocarbon to form a blend of discrete solid particles comprising at least two ingredients, the resulting composition being capable of flowing freely, said liquid hydrocarbon being one which does not exude from a fused mass of ethylene copolymer and liquid hydrocarbon obtained by mixing 50 g of powdered copolymer with the liquid hydrocarbon in the range specified in a metal dish, heating the dish at 120° C. to fuse the polymer, cooling the dish, holding the dish at minus 20° C. for 18 hours and then allowing the dish to warm to room temperature.

2. A process as claimed in claim 1, wherein the ethylene copolymer is mixed with from 80 to 120 parts by weight per 100 parts by weight of ethylene copolymer of said hydrocarbon.

3. A process as claimed in claim 1 or 2, wherein the blend additionally comprises a filler.

4. A process as claimed in claim 3, wherein the filler is low density inorganic filler.

5. A process as claimed in claim 4, wherein the filler is magnesium carbonate and/or calcium carbonate.

6. A process as claimed in claim 5, wherein the filler has a specific surface area of 2.5 to 3.4 cm.$^2$/mg.

7. A process as claimed in claim 4 wherein the filler has a specific surface area of 2.5 to 3.4 cm.$^2$/mg.

8. A process as claimed in claim 1 wherein the ethylene copolymer has a particle size not exceeding 1200 microns.

9. A process as claimed in claim 1 or 8, wherein the ethylene copolymer has a particle size with 80% of the particles not exceeding 700 microns.

10. A process as claimed in claim 1 or 8 wherein the ethylene copolymer is an ethylene-acrylate or ethylene-vinyl acetate copolymer.

11. A process as claimed in claim 10, wherein the ethylene copolymer is an ethylene-vinyl acetate copolymer comprising 10 to 40% by weight of copolymerised vinyl acetate units.

12. A process as claimed in claim 11, wherein the copolymer comprises 18 to 28% by weight of copolymerised vinyl acetate units.

13. A process as claimed in claim 1 wherein the blend additionally comprises one or more additives selected from the group consisting of modifier resins, waxes, plasticizers, antioxidants, thickeners, stabilisers, foaming agents, blowing agents, and, in the case of an aqueous dispersion, preformed copolymer latices.

14. A process as claimed in claim 1, wherein the mixing is carried out in air and the process additionally comprises subsequently dispersing the resulting powder blend in water.

15. A process as claimed in claim 1, wherein the mixing is carried out in the presence of water to provide an aqueous dispersion of said blend.

16. A process as claimed in 15, wherein said process comprises mixing an aqueous dispersion comprising said ethylene copolymer with an aqueous dispersion comprising said liquid hydrocarbon.

17. A composition comprising a blend of an ethylene copolymer and a liquid hydrocarbon in the form of a free-flowing dry powder prepared by the process claimed in claim 1.

18. A composition comprising a blend of an ethylene copolymer and a liquid hydrocarbon in the form of a free-flowing aqueous dispersion prepared by the process claimed in claim 15.

19. A composition as claimed in claim 17 or 18, wherein the composition additionally comprises up to 600 parts by weight of inorganic filler based on the weight of the ethylene copolymer present.

20. The use of a composition as claimed in claim 17 or 18 as a hot melt composition or in a coating process comprising the steps of applying the composition to a substrate, applying heat to fuse the blend, and cooling the resulting melt.

21. A composition comprising a blend of an ethylene copolymer and a liquid hydrocarbon in the form of a free-flowing aqueous dispersion prepared by the process as claimed in claim 15.

22. A composition comprising a blend of an ethylene copolymer and a liquid hydrocarbon in the form of a free-flowing aqueous dispersion prepared by the process as claimed in claim 16.

23. A composition as claimed in claims 21 or 22, wherein the composition additionally comprises up to 600 parts by weight of inorganic filler based on the weight of the ethylene copolymer present.

24. The use of a composition as claimed in claim 21 or 22 as a hot melt composition or in a coating process, comprising the steps of applying the composition to a substrate, applying heat to fuse the blend, and cooling the resulting melt.

25. The use of a composition as claimed in claim 19 as a hot melt composition or in a coating process, comprising the steps of applying the composition to a substrate, applying heat to fuse the blend, and cooling the resulting melt.

26. The use of a composition as claimed in claim 23 as a hot melt composition or in a coating process, comprising the steps of applying the composition to a substrate, applying heat to fuse the blend, and cooling the resulting melt.

* * * * *